United States Patent
Nakamura

(10) Patent No.: US 8,054,600 B2
(45) Date of Patent: Nov. 8, 2011

(54) SWITCHING POWER SUPPLY DEVICE

(75) Inventor: Masaru Nakamura, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 458 days.

(21) Appl. No.: 12/345,042

(22) Filed: Dec. 29, 2008

(65) Prior Publication Data

US 2009/0174978 A1 Jul. 9, 2009

(30) Foreign Application Priority Data

Jan. 8, 2008 (JP) ................................. 2008-001381

(51) Int. Cl.
*H02H 3/20* (2006.01)
(52) U.S. Cl. ...................................................... 361/91.1
(58) Field of Classification Search .................. 361/91.1
See application file for complete search history.

(56) References Cited

U.S. PATENT DOCUMENTS

| | | | |
|---|---|---|---|
| 5,784,231 A * | 7/1998 | Majid et al. ................. | 363/56.11 |
| 2007/0217234 A1 | 9/2007 | Nakamura | |
| 2008/0175027 A1 | 7/2008 | Shimada et al. | |

FOREIGN PATENT DOCUMENTS

JP 2007-267501 10/2007

OTHER PUBLICATIONS

U.S. Appl. No. 12/212,285, filed Sep. 17, 2008, Nakamura.

* cited by examiner

*Primary Examiner* — Jared Fureman
*Assistant Examiner* — Nicholas Ieva
(74) *Attorney, Agent, or Firm* — Oblon, Spivak, McClelland, Maier & Neustadt, L.L.P.

(57) ABSTRACT

A switching power supply device includes: a switching element connected through a primary winding of a transformer to an output end of an input rectifying/smoothing circuit that rectifies and smoothes an alternating current input voltage and outputs a direct current input voltage; an output rectifying/smoothing circuit that rectifies and smoothes a voltage induced in a secondary winding of the transformer and outputs a direct current output voltage; and a control circuit that controls ON and OFF of the switching element. The control circuit includes an overvoltage protection circuit that detects a voltage corresponding to the direct current output voltage and a voltage corresponding to the alternating current input voltage, outputs an overvoltage operation prohibition signal for prohibiting ON and OFF operations of the switching element when the voltage corresponding to the direct current output voltage rises to a first threshold value or more, and releases the overvoltage operation prohibition signal when the alternating current input voltage drops and the voltage corresponding to the alternating current input voltage falls down below a second threshold value.

9 Claims, 9 Drawing Sheets

SWITCHING POWER SUPPLY DEVICE

BACKGROUND OF THE INVENTION

1. Field of the Invention

The present invention relates to a switching power supply device in a power IC to which an activation terminal and a drain terminal of a power MOSFET are commonly connected. In order to avoid a phenomenon that a time required for releasing an operation prohibited state of a switching element after operating an overvoltage protection circuit and then turning off an alternating current input voltage is extremely long, the switching power supply device of the present invention monitors the alternating current input voltage, and releases the operation prohibited state of the switching element when the alternating current input voltage drops to a threshold value or less, and thereby releases the operation prohibited state of the switching element instantaneously after turning off an alternating current power supply even in a high-power power supply system in which a capacitance value of an input smoothing capacitor is large.

2. Description of the Related Art

As a conventional switching power supply device, there is a device that protects a switching element in the following manner when a secondary side output voltage becomes an overvoltage owing to such an abnormal state that an output voltage detection circuit turns to an open state. Specifically, for the purpose of protecting the switching element, such an overvoltage state of the secondary side output voltage is indirectly detected by a primary side power supply voltage through a transformer, a switching operation is then stopped, and an operation prohibited state is maintained for a while until an AC plug is pulled out.

FIG. 1 is a circuit diagram showing an example of this type of switching power supply device. This switching power supply device includes an input rectifying/smoothing circuit 10, a transformer 20, a primary winding 21 of the transformer 20, a drive winding 23, an activation circuit 30, a first switch 31, a Zener diode 32, an inverter 33, a second switch 34, a rectifying/smoothing circuit 40, a low-voltage malfunction prevention circuit 50, a reference voltage circuit 60, a feedback control circuit 70, a switching element 80, an overcurrent detection circuit 90, a PWM control circuit 100, a NOR gate 110, a drive circuit 120, a low-input protection circuit 160, an overvoltage protection circuit 180, and an integrated circuit 190e composed of a control circuit.

Next, a description is made of configurations and operations of the respective units by using a timing chart shown in FIG. 2. First, an alternating current input voltage V1 of an alternating current power supply is inputted to the input rectifying/smoothing circuit 10. Then, the alternating current input voltage V1 is rectified by a diode bridge composed of diodes 11 to 14, is thereafter smoothed by a smoothing capacitor 15, and is outputted as a direct current input voltage V2 from the input rectifying/smoothing circuit 10. Then, the direct current input voltage V2 is supplied to the switching element 80 through the primary winding 21 of the transformer 20.

When the switching element 80 is switched on and off, the direct current input voltage V2 is converted into an alternating current voltage. Then, energy is transmitted from the primary winding 21 of the transformer 20 to a secondary winding 22 of the transformer 20 and the drive winding 23.

When the direct current input voltage V2 rises and reaches a breakdown voltage V3 of the Zener diode 32, the activation circuit 30 supplies an activation current I3 to a capacitor 42 of the rectifying/smoothing circuit 40.

Then, at the time of activation, the activation current I3 charges the capacitor 42 of the rectifying/smoothing circuit 40. In such a way, a power supply voltage V4 is raised. Moreover, after the switching operation is started, the power supply voltage V4 is generated from a voltage induced by the drive winding 23 of the rectifying/smoothing circuit 40, and is supplied to the integrated circuit 190e composed of the control circuit.

The power supply voltage V4 reaches a first threshold value V5a of the low-voltage malfunction prevention circuit 50. Then, the reference voltage circuit (REG) 60 operates, and a reference voltage V6 is supplied to the respective circuit blocks. In such a way, the switching element 80 starts the switching operation. At this time, the second switch 34 is simultaneously turned to the open state through the inverter 33, whereby the activation current I3 is stopped.

A current detection resistor 91 of the overcurrent detection circuit 90 detects, as a voltage, a current I1 with a triangular waveform, which flows during an ON period of the switching element 80. Then, a low pass filter 92 of the overcurrent detection circuit 90 only passes a low frequency component of the detected voltage therethrough, and outputs an overcurrent signal V8 to a comparator 75.

The feedback control circuit 70 generates a control voltage V7 based on an error amplified signal from an output voltage detection circuit 140. Here, the output voltage detection circuit 140 includes photocouplers 141a and 141b, a resistor 142, and a Zener diode 143. Then, the PWM comparator 75 of the feedback control circuit 70 compares the control voltage V7 and the overcurrent signal V8 with each other. Then, when the overcurrent signal V8 rises to the control voltage V7 or more, an OFF trigger signal of the switching element 80 is outputted to the PWM control circuit 100. In such a way, a PWM control of the switching element 80 is performed.

The low-input protection circuit 160 is a circuit for preventing excessive spread of an ON duty of the switching element 80 and a breakage of the switching element 80 when a low voltage is applied as the alternating current input voltage V1 owing to adverse power supply circumstances and the like. The low-input protection circuit 160 is composed of two voltage dividing resistors 161 and 162, a smoothing capacitor 163, and an input detection comparator 164.

The alternating current input voltage V1 is subjected to half-wave rectification by the diodes 12 and 14, is thereafter dropped by the two voltage dividing resistors 161 and 162, and is supplied to the smoothing capacitor 163. Then, the smoothing capacitor 163 smoothes the dropped half-wave rectified voltage, and generates an input detection signal V10 proportional to the alternating current input voltage V1. In such a way, the input detection signal V10 is inputted to the input detection comparator 164. The input detection comparator 164 compares the input detection signal V10 and an input detection threshold value V9 with each other. Then, when the input detection signal V10 falls down below the input detection threshold value V9, the input detection comparator 164 determines that the present state is a low input state, and switches an operation prohibition signal V12 from an L level to an H level. In such a way, the switching operation of the switching element 80 is stopped, and the switching element 80 is protected.

When such abnormality that the output voltage detection circuit 140 turns to the open state occurs, an output voltage V11 sometimes rises to the threshold value or more. At this time, the overvoltage protection circuit 180 indirectly detects an overvoltage state of the output voltage V11 through the transformer 20 by the power supply voltage V4. In such a way, the overvoltage protection circuit 180 stops the switching operation of the switching element 80, and performs overvoltage protection. Next, a description is made of detailed operations of the overvoltage protection circuit while referring to the timing chart of FIG. 2.

First, at the time of a stationary operation, a voltage, as the power supply voltage V4, of which magnitude is a product of a turns ratio of the drive winding 23 and the secondary winding 22 and the output voltage V11 decided by a breakdown voltage of the Zener diode 143 provided in the output voltage detection circuit 140 is generated.

Here, when such abnormality that the output voltage detection circuit 140 turns to the open state occurs, the output voltage V11 rises (overvoltage state). Then, the power supply voltage V4 also rises in proportion to the output voltage V11. Then, when the power supply voltage V4 rises to an overvoltage detection threshold value V13 or more, an overvoltage detection comparator 181 outputs a SET signal to a SET terminal of an overvoltage latch 182. Then, an overvoltage operation prohibition signal V14 switches from the L level to the H level.

At this time, the overvoltage operation prohibition signal V14 prohibits the switching operation of the switching element 80 through a NOR gate 110, and at the same time, turns the first switch 31 to a conductive state.

Thereafter, when the power supply voltage V4 drops to the threshold voltage decided in the activation circuit 30, the activation circuit 30 supplies the activation current I3. In such a way, the power supply voltage V4 is prevented from dropping to a release threshold value V18 of the overvoltage latch 182. In such a way, the operation prohibited state of the switching element 80 is maintained (operation prohibition period).

Next, the alternating current input voltage V1 is turned OFF in order to release the operation prohibited state. Then, the direct current input voltage V2 drops slowly while discharging the smoothing capacitor 15. Then, when the direct current input voltage V2 drops to the breakdown voltage V3 of the Zener diode 32, the activation current I3 is stopped. Therefore, the power supply voltage V4 starts to drop (alternating current power supply OFF period).

When the power supply voltage V4 drops to the overvoltage latch release threshold value V18 or less, a latch release comparator 183 outputs a release signal to a RESET terminal of the overvoltage latch 182. In such a way, the overvoltage operation prohibition signal V14 switches from the H level to the L level, and the operation prohibited state is released (operation prohibition release period).

Incidentally, it is considered ideal that the operation prohibition release period as a time for releasing the operation prohibited state after the overvoltage is detected and the alternating current input voltage is then turned OFF be as short as possible.

Moreover, as a related technology of the conventional switching power supply device, an uninterruptible power supply device described in Patent Publication 1 is known. This uninterruptible power supply device stops the power supply operation once after an output overvoltage is detected, then detects a pulsating voltage of an alternating current input, and automatically resumes the power supply for each cycle of the alternating current power supply. Then, in the case where the overvoltage state continues, such automatic resuming is stopped after counting the number of automatic resuming times.

[Patent Publication 1] Japanese Patent Laid-Open Publication No. 2007-268501

SUMMARY OF THE INVENTION

However, in the conventional switching power supply device shown in FIG. 1, a load current for discharging the smoothing capacitor 15 with a relatively large capacitance value is the activation current I3, and the activation current I3 is as relatively small as approximately 1 mA. Therefore, a time required for releasing the operation prohibited state by sufficiently discharging charges of the smoothing capacitor 15 becomes as extremely long as approximately several ten seconds. Moreover, if the power capacity of the power supply set becomes larger, then the smoothing capacitor 15 also requires a larger capacitance. Therefore, the time required for releasing the operation prohibited state becomes longer.

Moreover, in Patent Publication 1, the overvoltage that is extra is applied to a load circuit every time when automatically resuming the uninterruptible power supply device. Moreover, there has been a problem that there is no means for turning on the uninterruptible power supply device after the automatic resuming is stopped.

It is an object of the present invention to provide a switching power supply device that, even if the capacitance value of the input smoothing capacitor is large, releases the operation prohibited state of the switching element instantaneously after the overvoltage protection operation and the turning OFF of the alternating current power supply, thus making it possible to shorten the time for releasing the operation prohibited state.

A switching power supply device according to a first aspect of the present invention includes: an input rectifying/smoothing circuit that rectifies and smoothes an alternating current input voltage and outputs a direct current input voltage; a switching element connected to an output end of the input rectifying/smoothing circuit through a primary winding of a transformer; an output rectifying/smoothing circuit that rectifies and smoothes a voltage induced in a secondary winding of the transformer and outputs a direct current output voltage; and a control circuit that controls ON and OFF of the switching element. Moreover, the control circuit includes an overvoltage protection circuit that detects a voltage corresponding to the alternating current input voltage and a voltage corresponding to the direct current output voltage, outputs an overvoltage operation prohibition signal for prohibiting ON and OFF operations of the switching element when the voltage corresponding to the direct current output voltage rises to a first threshold value or more, and releases the overvoltage operation prohibition signal when the alternating current input voltage drops and the voltage corresponding to the alternating current input voltage falls down below a second threshold value.

In such a configuration, it is preferable that the overvoltage protection circuit detect a voltage obtained by rectifying and smoothing the alternating current input voltage.

Alternatively, it is preferable that the overvoltage protection circuit detect a pulsating voltage proportional to a peak value of the alternating current input voltage.

Alternatively, it is preferable that the overvoltage protection circuit perform current conversion for a pulsating voltage proportional to a peak value of the alternating current input voltage, and detect the voltage subjected to the current conversion.

Moreover, it is preferable that the control circuit include a low-input protection circuit that detects the voltage corresponding to the alternating current input voltage, and it is preferable that an input terminal of the low-input protection circuit be connected, on an integrated circuit, commonly with an input terminal for detecting the voltage corresponding to the alternating current input voltage in the overvoltage protection circuit.

A switching power supply device according to a second aspect of the present invention includes: an input rectifying/ smoothing circuit that rectifies and smoothes an alternating current input voltage and outputs a direct current input voltage; a switching element connected to an output end of the input rectifying/smoothing circuit through a primary winding of a transformer; an output rectifying/smoothing circuit that rectifies and smoothes a voltage induced in a secondary winding of the transformer and outputs a direct current output voltage; and a control circuit that controls ON and OFF of the switching element. Here, the control circuit includes: an overvoltage protection circuit that detects a voltage corresponding to the direct current output voltage; and a low-input protection circuit that is connected to the overvoltage protection circuit and detects a voltage corresponding to the alternating current input voltage. Moreover, the overvoltage protection circuit outputs an overvoltage operation prohibition signal for prohibiting ON and OFF operations of the switching element when the voltage corresponding to the direct current output voltage rises to a first threshold value or more. Furthermore, the low-input protection circuit outputs a signal for releasing the overvoltage operation prohibition signal to the overvoltage protection circuit when the alternating current input voltage drops and the voltage corresponding to the alternating current input voltage falls down below a second threshold value.

In such a configuration, it is preferable that the low-input protection circuit rectify and smooth the alternating current input voltage, and detect the rectified and smoothed voltage.

Alternatively, it is preferable that the low-input protection circuit detect a pulsating voltage proportional to a peak value of the alternating current input voltage.

Alternatively, it is preferable that the low-input protection circuit perform current conversion for a pulsating voltage proportional to a peak value of the alternating current input voltage, and detect the voltage subjected to the current conversion.

In accordance with the aspects of the present invention, the overvoltage protection circuit detects the voltage corresponding to the direct current output voltage and the voltage corresponding to the alternating current input voltage, outputs the overvoltage operation prohibition signal when the voltage corresponding to the direct current output voltage rises to the first threshold value or more, and releases the overvoltage operation prohibition signal when the alternating current input voltage drops and the voltage corresponding to the alternating current input voltage falls down below the second threshold value. In such a way, even in a high-power power supply system in which the capacitance value of the input smoothing capacitor is large, the operation prohibited state is released instantaneously after the alternating current input voltage is turned OFF, thus making it possible to shorten the time for releasing the operation prohibited state. Hence, the high-power power supply system can be resumed rapidly by turning ON the alternating current input voltage one more time.

DETAILED DESCRIPTION OF EMBODIMENTS

Figure 1:
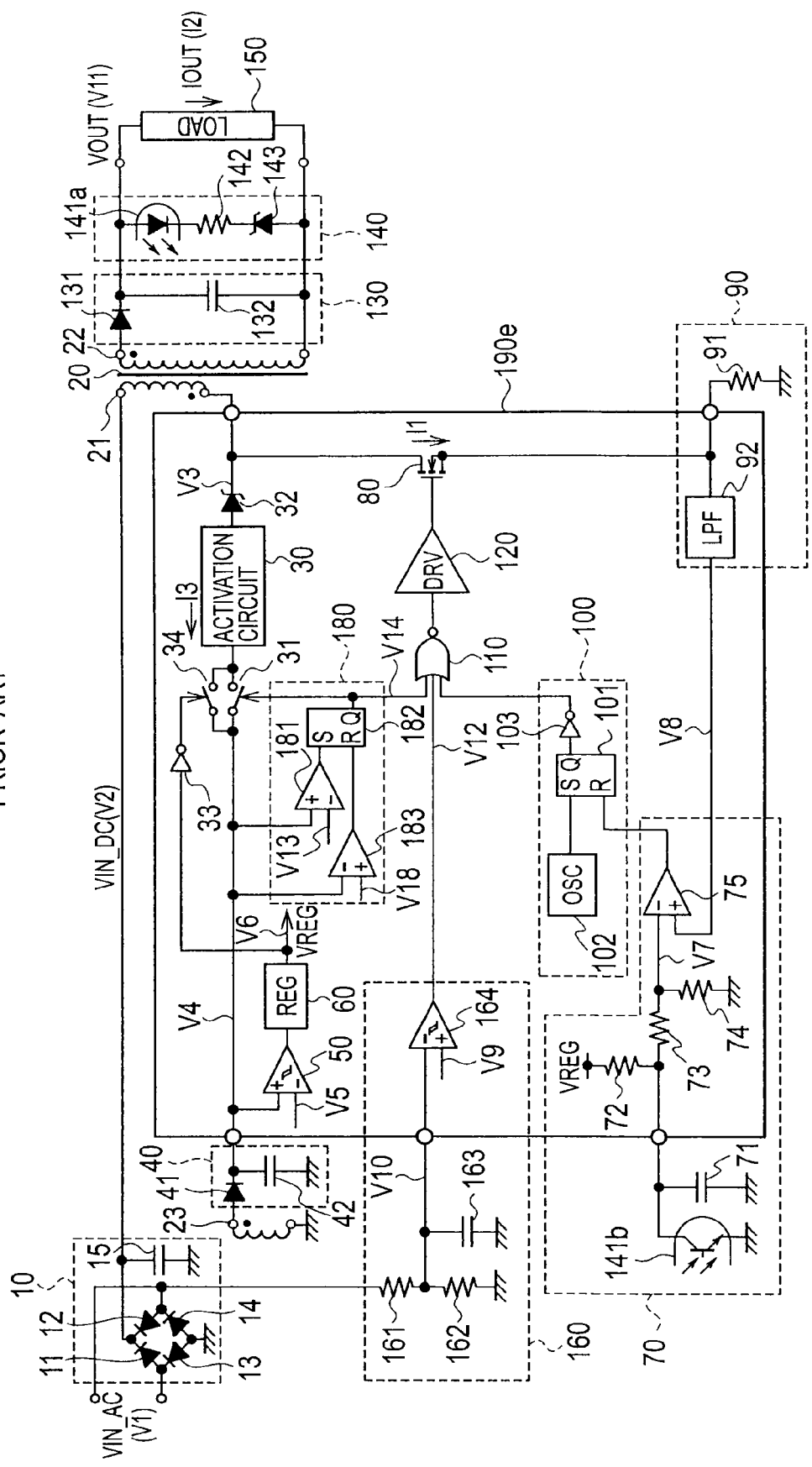
FIG. 1 is a circuit diagram showing an example of a conventional switching power supply device.
Figure 2:
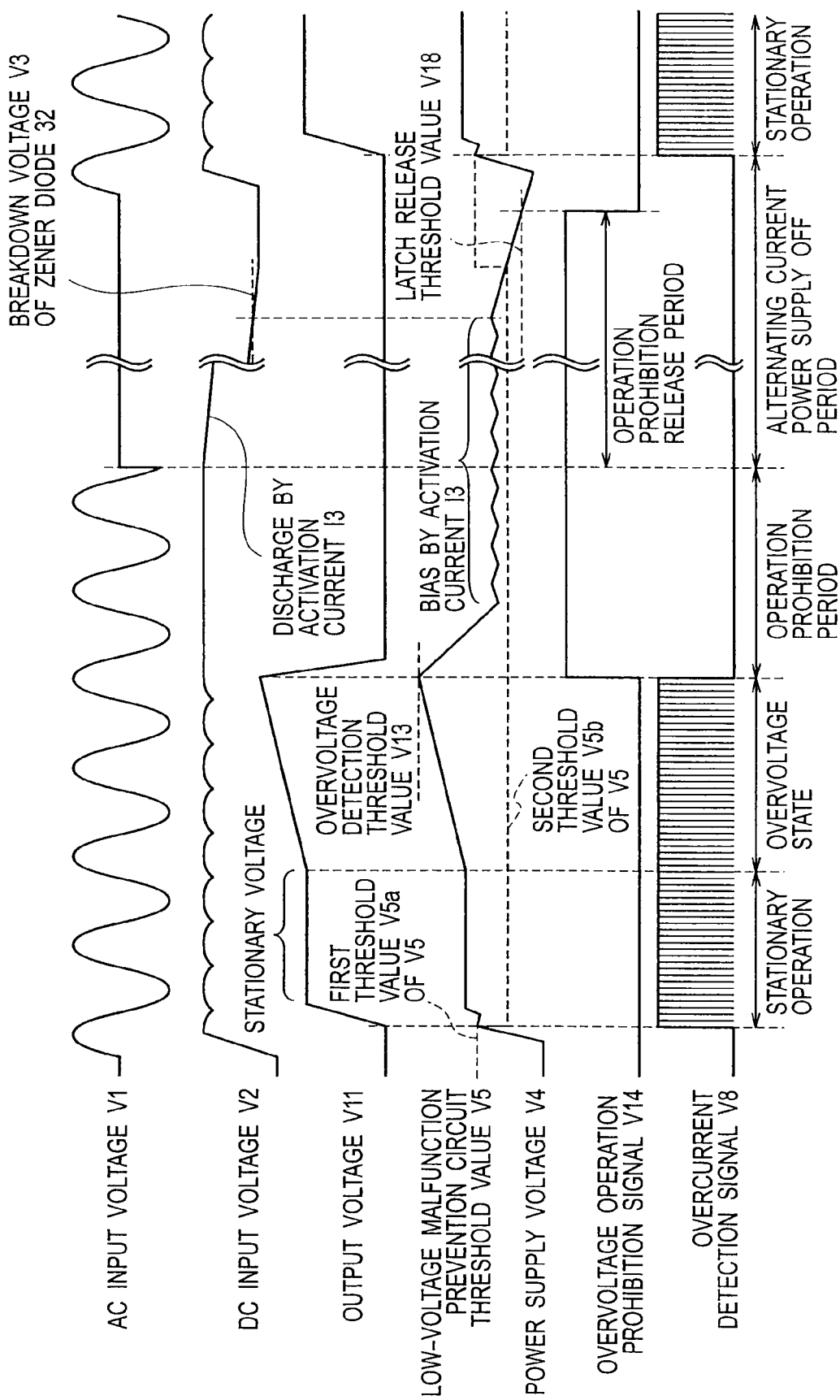
FIG. 2 is a timing chart showing operations of the conventional switching power supply device.

Embodiments of a switching power supply device according to the present invention will be described below in detail while referring to the drawings.

Embodiment 1

Figure 3:
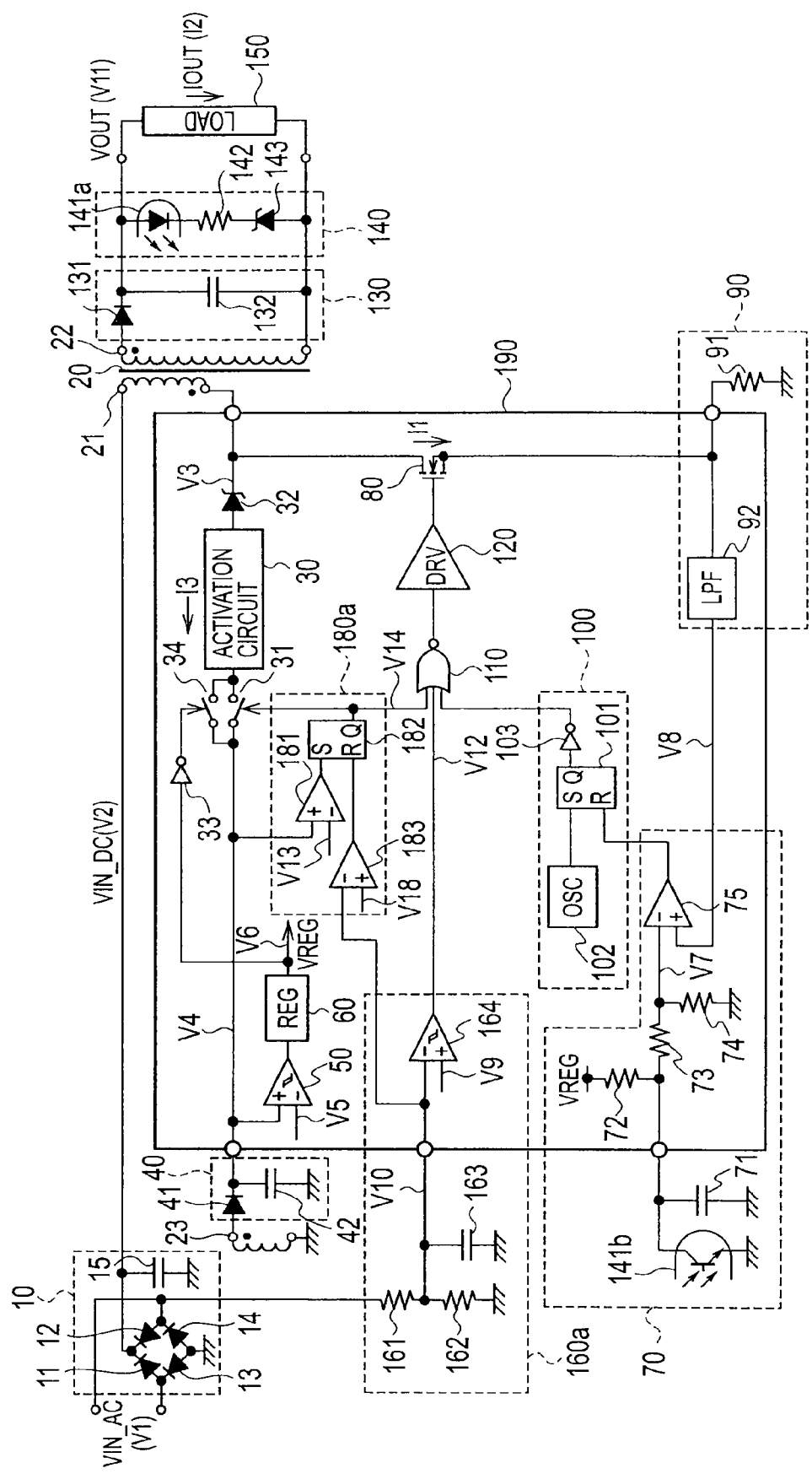
FIG. 3 is a circuit diagram of a switching power supply device of embodiment 1.

A switching power supply device of embodiment 1 shown in FIG. 3 includes an input rectifying/smoothing circuit 10, a transformer 20, a primary winding 21 of the transformer 20, a drive winding 23, an activation circuit 30, a first switch 31, a Zener diode 32, an inverter 33, a second switch 34, a rectifying/smoothing circuit 40, a low-voltage malfunction prevention circuit 50, a reference voltage circuit 60, a feedback control circuit 70, a switching element 80, an overcurrent detection circuit 90, a PWM control circuit 100, a NOR gate 110, a drive circuit 120, a low-input protection circuit 160a, an overvoltage protection circuit 180a, and an integrated circuit 190 composed of a control circuit. Moreover, a secondary side circuit of the transformer 20 includes a secondary winding 22 of the transformer 20, an output rectifying/smoothing circuit 130, an output voltage detection circuit 140, and an output load 150.

A circuit configuration of embodiment 1 shown in FIG. 3 is different from the conventional circuit configuration shown in FIG. 1 only in the low-input protection circuit 160a and the overvoltage protection circuit 180a. Hence, a description is made only of the configurations of these circuits, and a description of other configurations is omitted.

The low-input protection circuit 160a is a circuit for preventing excessive spread of an ON duty of a switching element 80 and a breakage of the switching element 80, which is caused thereby, when the a low voltage is applied as an alternating current input voltage V1 owing to adverse power supply circumstances and the like. This low-input protection circuit 160a is composed of two voltage dividing resistors 161 and 162, a smoothing capacitor 163, and an input detection comparator 164. The alternating current input voltage V1 is subjected to half-wave rectification by the diodes 12 and 14, is thereafter dropped by the two voltage dividing resistors 161 and 162, and is supplied to the smoothing capacitor 163. The smoothing capacitor 163 smoothes the dropped half-wave rectified voltage, and generates an input detection signal V10 proportional to the alternating current input voltage V1. Then, the input detection signal V10 is inputted to an inversion input terminal of the input detection comparator 164 and an inversion input terminal of an overvoltage latch release comparator 183 of the overvoltage protection circuit 180a.

The input detection comparator 164 compares the input detection signal V10 and an input detection threshold value V9 with each other. Then, when the input detection signal V10 is in a low input state of falling down below the input detection threshold value V9, the input detection comparator 164 switches an operation prohibition signal V12 from an L level to an H level, and stops a switching operation of the switching element 80. In such a way, the switching element 80 is protected.

The overvoltage protection circuit 180a includes an overvoltage detection comparator 181, an overvoltage latch 182 composed of a flip-flop, and the overvoltage latch release comparator 183. When abnormality occurs in such a feedback circuit as the output voltage detection circuit 140, an output voltage V11 rises to a specified value thereof or more. At this time, the overvoltage detection comparator 181 indirectly detects an overvoltage state of the output voltage V11 through the transformer 20 by a power supply voltage V4, and thereby performs overvoltage protection. Then, when the input detection signal V10 drops to a latch release threshold value V18 or less, the overvoltage latch release comparator 183 outputs a latch release signal to a RESET terminal of the overvoltage latch 182.

Figure 4:
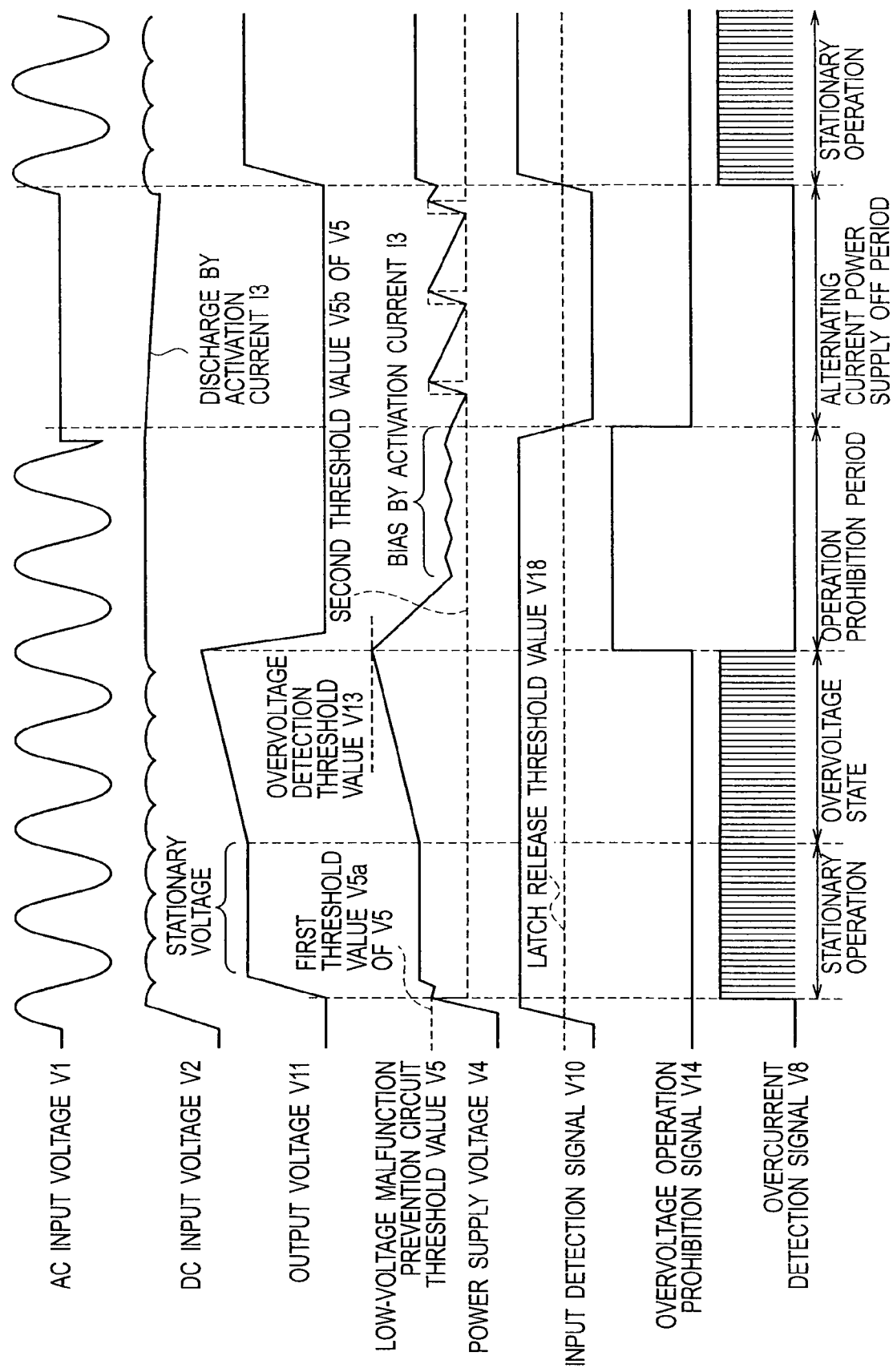
FIG. 4 is a timing chart showing operations of the switching power supply device of embodiment 1.

Next, a description is made of detailed operations of the overvoltage protection circuit 180a while referring to a timing chart of FIG. 4.

First, at the time of a stationary operation, a voltage, as the power supply voltage V4, of which magnitude is a product of a turns ratio of the drive winding 23 and the secondary winding 22 and the output voltage V11 decided by a breakdown voltage of a Zener diode 143 is generated.

Here, when such abnormality that the output voltage detection circuit 140 turns to an open state occurs, the output voltage V11 rises (overvoltage state). Then, the power supply voltage V4 also rises in proportion to the output voltage V11. Then, when the power supply voltage V4 rises to an overvoltage detection threshold value V13 or more, the overvoltage detection comparator 181 outputs a SET signal to a SET terminal of the overvoltage latch 182. In such a way, an overvoltage operation prohibition signal V14 switches from the L level to the H level.

At this time, the overvoltage operation prohibition signal V14 prohibits the switching operation of the switching element 80 through the NOR gate 110, and at the same time, turns the first switch 31 to a conductive state.

Thereafter, when the power supply voltage V4 drops to a threshold voltage decided in the activation circuit 30, the activation circuit 30 supplies an activation current I3. In such a way, the power supply voltage V4 is prevented from dropping to a second threshold value V5b of the low-voltage malfunction prevention circuit 50. Then, in such a way, the operation prohibited state is maintained (operation prohibition period).

Next, the alternating current input voltage V1 is turned OFF in order to release the operation prohibited state. Then, the smoothing capacitor 163 with a relatively small capacitance discharges, and the input detection signal V10 drops instantaneously.

Then, when the input detection signal V10 drops to the latch release threshold value V18 or less, the overvoltage latch release comparator 183 outputs the latch release signal to the RESET terminal of the overvoltage latch 182. In such a way, the operation prohibited state is released, and at the same time, the first switch 31 becomes nonconductive. Therefore, the activation current I3 is stopped.

In such a way, when the power supply voltage V4 drops once to the second threshold value V5b of the low-voltage malfunction prevention circuit 50, the second switch 34 is switched ON. Then, at this time, in the case where charges remain sufficiently in an input smoothing capacitor 15, the activation current I3 is supplied to a capacitor 42 one more time. In such a way, the power supply voltage V4 rises.

At this time, even if the power supply voltage V4 reaches a first threshold value V5a of the low-voltage malfunction prevention circuit 50 and the second switch 34 is switched OFF, the operation prohibition signal V12 is set at the H level. Therefore, the power supply voltage V4 drops one more time, and the activation operation is repeated (alternating current power supply OFF period). Thereafter, when the alternating current input voltage V1 is applied one more time, and the input detection signal V10 exceeds the input detection threshold value V9, the comparator 164 outputs the L level to the NOR gate 110. As a result, an output of the NOR gate 110 turns to the H level, whereby the switching element 80 resumes the switching operation (stationary operation).

As described above, the switching power supply device of embodiment 1 monitors the alternating current input voltage V1, and releases the operation prohibited state when the alternating current input voltage V1 drops to the threshold value or less. In such a way, even in a high-power type power supply system in which a capacitance value of the input smoothing capacitor 15 is large, the operation prohibited state of the switching element 80 is released instantaneously after the alternating current input voltage V1 is turned OFF.

Moreover, the terminal for monitoring the alternating current input voltage V1 is made to serve also as the input terminal of the existing low-input protection circuit (brownout protection circuit). In such a way, a compact package such as a DIP8 package in which the number of terminals is small can be realized. As a result, a space for the power supply system is saved.

Furthermore, the circuit for monitoring the alternating current input voltage is shared with the existing input detection circuit (brownout protection circuit). As a result, an inexpensive power supply system is provided.

Embodiment 2

Figure 5:
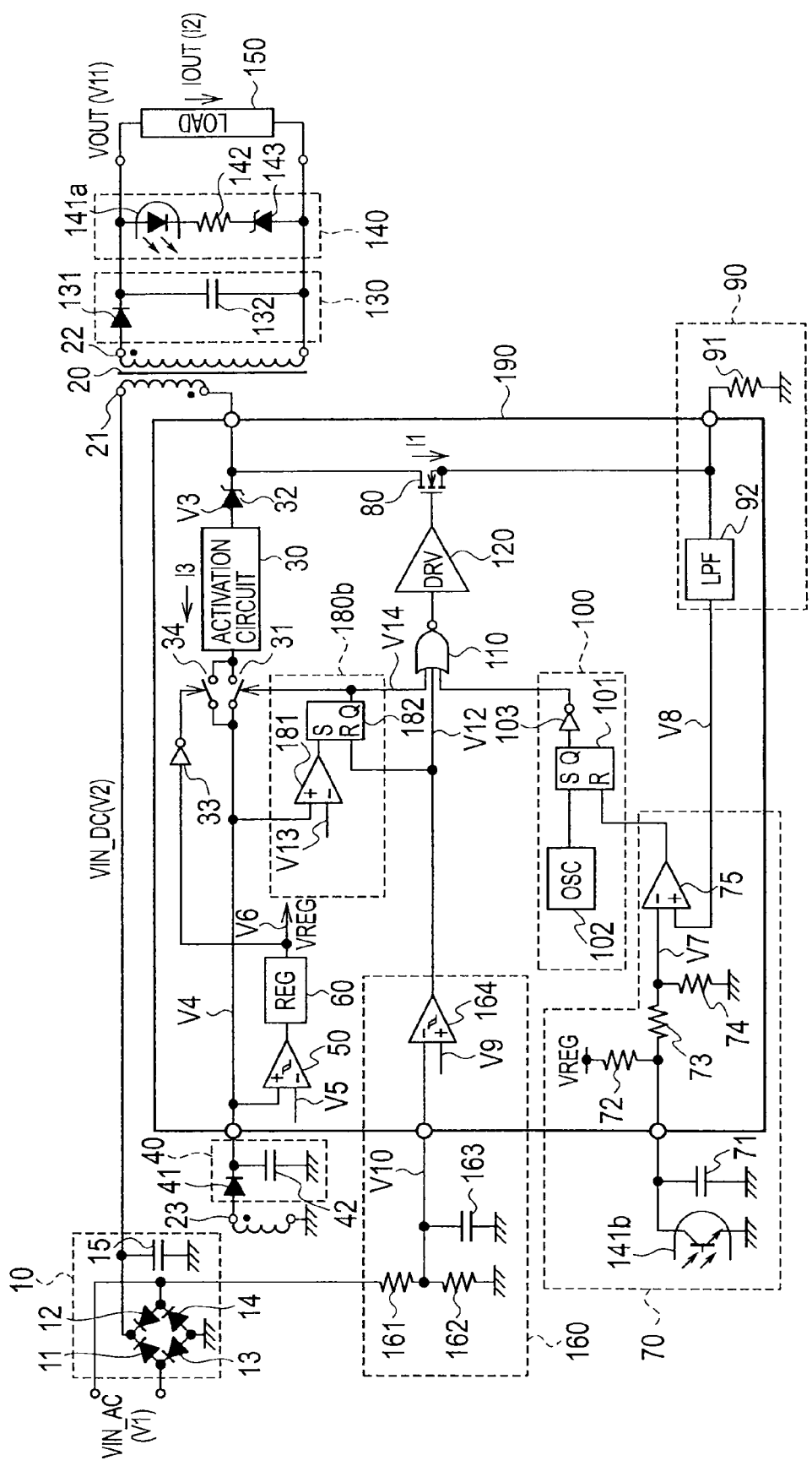
FIG. 5 is a circuit diagram of a switching power supply device of embodiment 2.

From a switching power supply device of embodiment 2 shown in FIG. 5, the overvoltage latch release comparator 183 provided in the switching power supply device of embodiment 1 shown in FIG. 3 is deleted. On the contrary, the switching power supply device of embodiment 2 includes an overvoltage protection circuit 180b having the overvoltage detection comparator 181 and the overvoltage latch 182 that receives, as a RESET signal, the operation prohibition signal V12 of the input detection comparator 164 of the low-input protection circuit 160 to the RESET terminal thereof.

Even with such a configuration of the switching power supply device of embodiment 2, similar operations and effects to those of the switching power supply device of embodiment 1 can be obtained. Moreover, the overvoltage latch release comparator 183 is deleted, whereby a power supply system that is more inexpensive and capable of achieving the space saving more is provided.

Moreover, in comparison with the switching power supply device of embodiment 1, in the switching power supply device of embodiment 2, the circuit for monitoring the alternating current input voltage V1 is made to serve also as the existing input detection circuit (brownout protection circuit). In such a way, such an inexpensive power supply system is provided.

Embodiment 3

Figure 6:
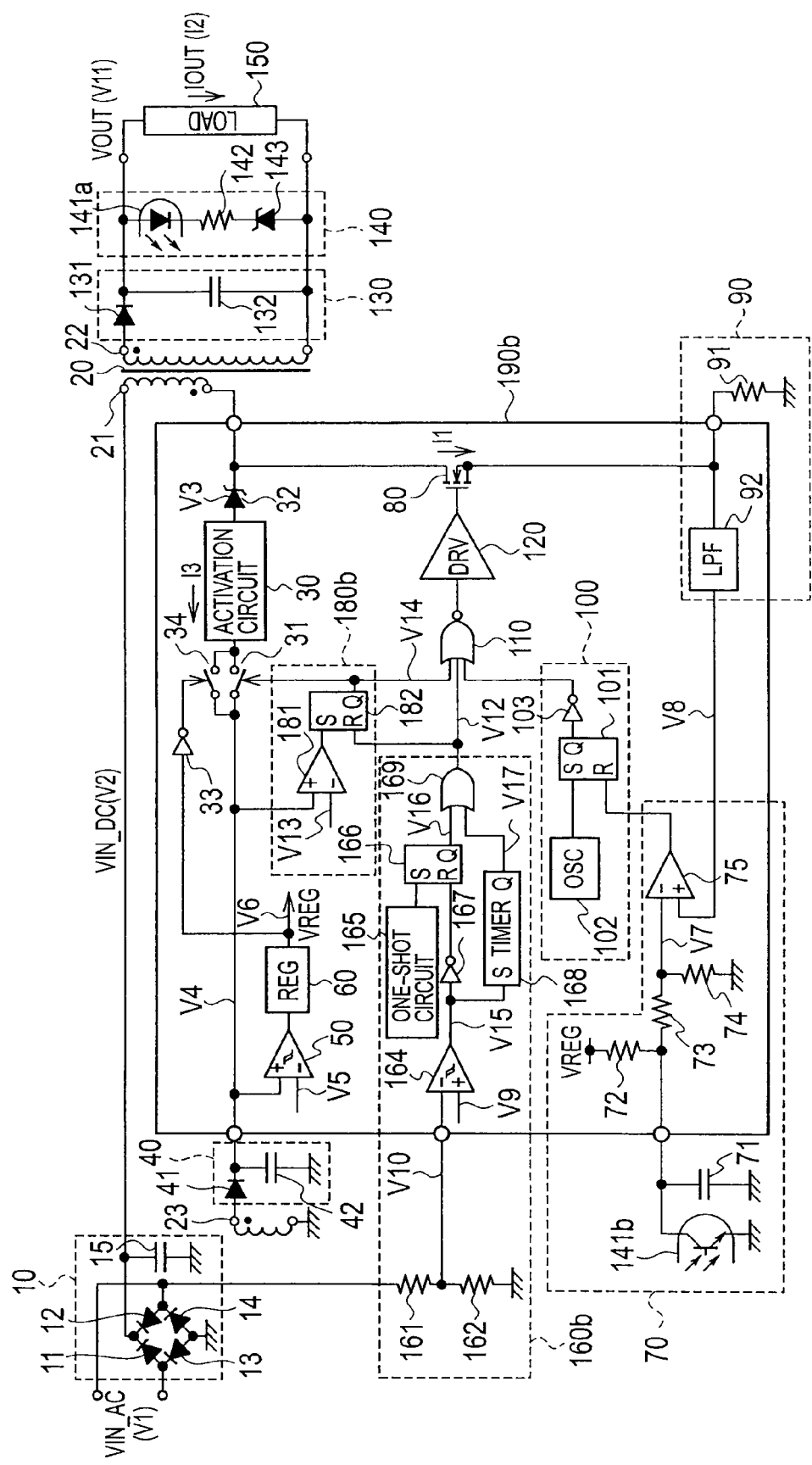
FIG. 6 is a circuit diagram of a switching power supply device of embodiment 3.

A switching power supply device of embodiment 3 shown in FIG. 6 includes a low-input protection circuit 160b that is different in configuration from that of the switching power supply device of embodiment 1 shown in FIG. 3.

The low-input protection circuit 160b is composed of the two voltage dividing resistors 161 and 162, the input detection comparator 164, a one-shot circuit 165, an input detection latch 166 composed of a flip-flop, an inverter 167, a timer 168, and an OR gate 169. Here, the input detection comparator 164, the one-shot circuit 165, the input detection latch 166, the inverter 167, the timer 168 and the OR gate 169 are provided in an integrated circuit 190b. Moreover, the two voltage dividing resistors 161 and 162 are provided outside of the integrated circuit 190b.

Here, the smoothing capacitor 163 necessary as an external component of the integrated circuit 190 shown in FIG. 3 and FIG. 5 can be deleted. Therefore, a power supply system that is more inexpensive and capable of achieving the space saving more is provided.

The inverter 167 inverts an output of the input detection comparator 164, and the output thus inverted is inputted to a RESET terminal R of the input detection latch 166. At the time when activating the power supply, the one-shot circuit 165 supplies a trigger signal of the H level to a SET terminal S of the input detection latch 166. The OR gate 169 takes an OR of the output of the input detection latch 166 and an output of the timer 168. The NOR gate 110 takes a NOR of an output of the OR gate 169, an output of the PWM control circuit 100 and the output of the timer 168.

Next, a description is made of low-input protection operations by the low-input protection circuit 160b.

First, when the power supply voltage V4 rises to the first threshold value V5a of the low-voltage malfunction prevent circuit 50 or more, the reference voltage circuit 60 supplies the reference voltage V6 to the respective blocks. At this time, the one-shot circuit 165 outputs a SET trigger signal to the SET terminal of the input detection latch 166.

Therefore, a first operation prohibition signal V16 switches from the L level to the H level. Then, the operation prohibition signal V12 of the H level is inputted from the OR gate 169 to the NOR gate 110. Therefore, the switching operation of the switching element 80 is prohibited.

To the input detection comparator 164, the two voltage dividing resistors 161 and 162 output the input detection signal V10 obtained by dropping the alternating current input voltage V1 subjected to the half-wave rectification.

The input detection comparator 164 compares the input detection signal V10 and the input detection threshold value V9 with each other. Then, when the input detection signal V10 exceeds the input detection threshold value V9, the input detection comparator 164 determines that the alternating current input voltage V1 is in a normal input state, and supplies the RESET signal to the RESET terminal R of the input detection latch 166 through the inverter 167. At this time, the first operation prohibition signal V16 switches from the H level to the L level, and accordingly, the switching operation of the switching element 80 is started.

Meanwhile, when the input detection signal V10 falls down below the input detection threshold value V9, the input detection comparator 164 determines that the alternating current input voltage V1 is in a low-input state, and supplies a counting start signal V15 to a SET terminal of the timer 168.

The timer 168 starts a counting operation upon receiving the counting start signal V15. Then, when a period while the input detection signal V10 is falling down below the input detection threshold value V9 continues for a delay time (T>>20 ms) sufficiently longer than double of a commercial power supply cycle generated in an inside of the timer 168, the timer 168 switches a second operation prohibition signal V17 from the L level to the H level, and outputs the second operation prohibition signal V17 of the H level to the OR gate 169.

Since the OR gate 169 outputs the operation prohibition signal V12 of the H level to the NOR gate 110, the switching operation of the switching element 80 is stopped. By the above-described operations, the low-input protection operations can be performed.

Figure 7:
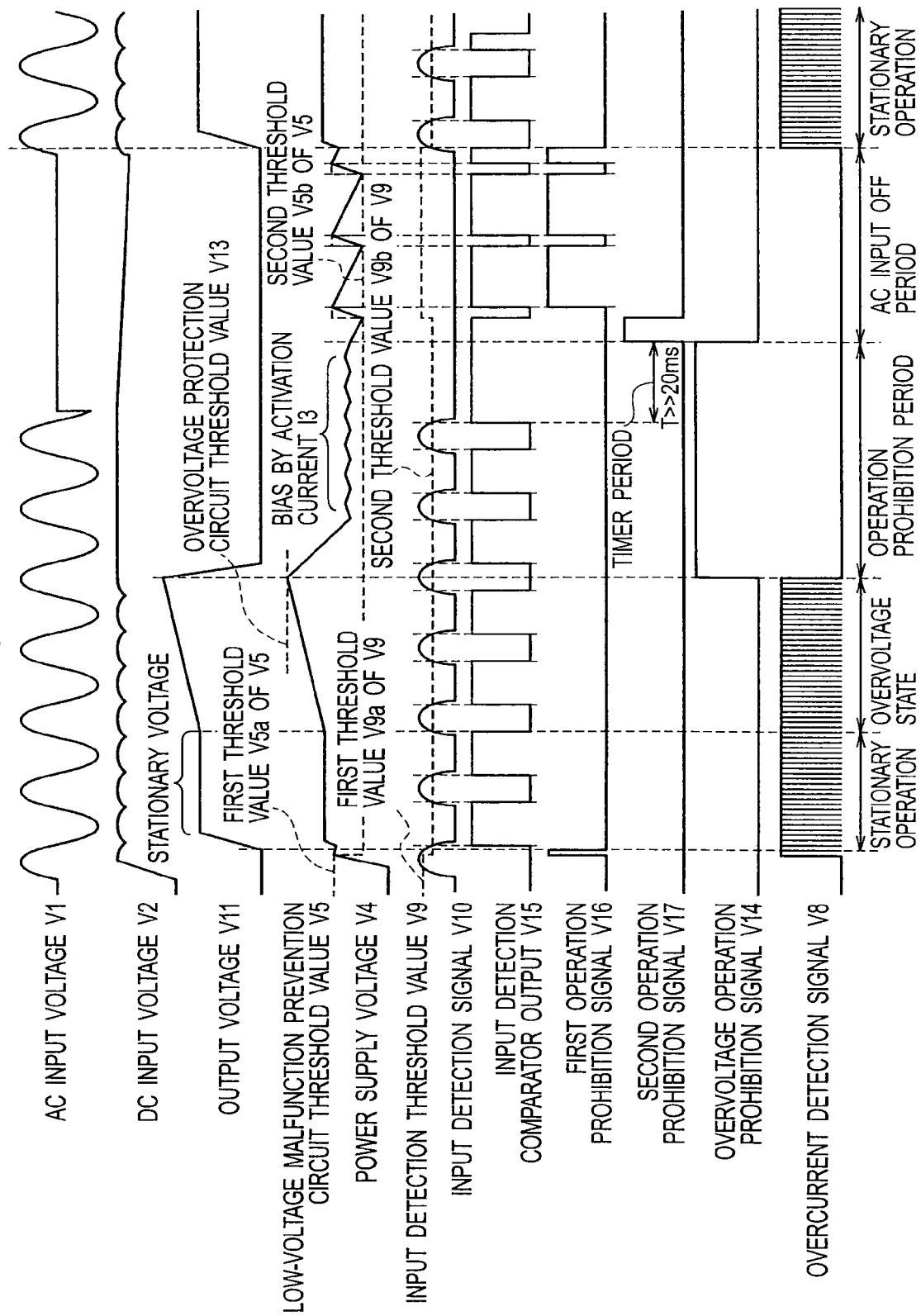
FIG. 7 is a timing chart showing operations of the switching power supply device of embodiment 3.

Next, a description is made of a series of operations of dropping the alternating current input voltage V1 and releasing the operation prohibited state, which are performed after the overvoltage protection circuit 180b is operated, while referring to a timing chart of FIG. 7.

First, at the time of the stationary operation, the voltage, as the power supply voltage V4, of which magnitude is the product of the turns ratio of the drive winding 23 and the secondary winding 22 and the output voltage V11 decided by the breakdown voltage of the Zener diode 143 is generated.

Here, when such abnormality that the output voltage detection circuit 140 turns to the open state occurs, the output voltage V11 rises (overvoltage state). Then, the power supply voltage V4 also rises in proportion to the output voltage V11. Then, when the power supply voltage V4 rises to the overvoltage detection threshold value V13 or more, the overvoltage detection comparator 181 outputs a SET signal of the H level to the SET terminal of the overvoltage latch 182. In such a way, the overvoltage operation prohibition signal V14 of an output terminal Q of the overvoltage latch 182 switches from the L level to the H level.

At this time, the overvoltage operation prohibition signal V14 prohibits the switching operation of the switching element 80 through the NOR gate 110. In such a way, the switching element 80 enters an operation prohibition period thereof. Therefore, a current does not flow through the switching element 80. Hence, an overvoltage current detection signal V8 becomes zero, and the output voltage V11 also becomes zero radically. Moreover, at the same time, the overvoltage operation prohibition signal V14 turns the first switch 31 to a conductive state.

Thereafter, the power supply voltage V4 drops to the threshold voltage decided in the activation circuit 30. Then, a breakdown occurs in the Zener diode 32, and the activation circuit 30 supplies the activation current I3, and thereby charges the capacitor 42. Hence, the power supply voltage V4 is prevented from dropping to the second threshold value V5b of the low-voltage malfunction prevention circuit 50. In such a way, the operation prohibited state of the switching element 80 is maintained (operation prohibition period).

Note that, during this operation prohibition period, when the input detection signal V10 is less than the input detection threshold value V9, the input detection comparator 164 outputs the H level as the counting start signal V15 to the timer 168 and the inverter 167. Meanwhile, when the input detection signal V10 is equal to or more than the input detection threshold value V9, the input detection comparator 164 outputs the L level to the timer 168 and the inverter 167.

Next, when the alternating current input voltage V1 is turned OFF, the input detection signal V10 starts to drop instantaneously. Then, when the input detection signal V10 drops to the input detection threshold value V9 or less, the input detection comparator 164 supplies the counting start signal V15 of the H level to the SET terminal of the timer 168.

The timer 168 starts the counting operation upon receiving the counting start signal V15 of the H level. Then, when the period while the input detection signal V10 is falling down below the input detection threshold value V9 continues for the delay time (T>>20 ms) sufficiently longer than the double of the commercial power supply cycle generated in the inside of the timer 168, the second operation prohibition signal V17 as the output of the timer 168 switches from the L level to the H level. Then, the second operation prohibition signal V17 of the H level is inputted as the RESET signal to the RESET terminal of the overvoltage latch 182 through the OR gate 169.

Then, the overvoltage operation prohibition signal V14 of the output terminal Q of the overvoltage latch 182 switches from the H level to the L level, and this overvoltage operation prohibition signal V14 is outputted to the first switch 31 and the NOR gate 110. In such a way, the operation prohibited state is released once.

At the same time, the first switch 31 turns to the open state. In such a way, the supply of the activation current I3 is stopped. Therefore, the power supply voltage V4 drops once to the second threshold value V5*b* of the low-voltage malfunction prevention circuit 50. Then, the low-voltage malfunction prevention circuit 50 outputs the L level to the reference voltage circuit 60, and the reference voltage circuit 60 is stopped. Therefore, the H level is outputted from the inverter 33 to the second switch 34, and the second switch 34 is switched ON. In the case where the charges remain sufficiently in the input smoothing capacitor 15, the activation current I3 is supplied to the capacitor 42 one more time. In such a way, the power supply voltage V4 rises.

Subsequently, when the power supply voltage V4 reaches the first threshold value V5*a* of the low-voltage malfunction prevention circuit 50, the reference voltage circuit 60 operates. At the same time, the second switch 34 is switched OFF, and the one-shot circuit 165 outputs the SET signal to the input detection latch 166. Then, the first operation prohibition signal V16 turns to the H level, and the operation prohibited state is brought about.

At this time, the second switch 34 is OFF. Therefore, thereafter, the power supply voltage V4 drops to the second threshold value V5*b* of the low-voltage malfunction prevent circuit 50 one more time, and the resuming is repeated. In such a way, the operation prohibited state is maintained (alternating current input OFF period).

Next, when the alternating current input voltage V1 is turned ON one more time, the input detection signal V10 starts to rise instantaneously. Then, when the input detection signal V10 rises to the input detection threshold value V9 or more, the input detection comparator 164 outputs the L level to the inverter 167. Then, the inverter 167 outputs the H level to the RESET terminal of the input detection latch 166. Therefore, the first operation prohibition signal V16 switches from the H level to the L level. The OR gate 169 outputs the signal V12 of the L level to the NOR gate 110 based on the first operation prohibition signal V16 of the L level and on the L level of the timer 168.

The NOR gate 110 outputs the H level to the switching element 80 through the drive circuit 120 based on the L level from the overvoltage latch 182, on the L level from the OR gate 169, and on the L level of the inverter 103. Therefore, the switching operation of the switching element 80 is started (stationary operation).

By the above-described series of operations, the half-wave rectified voltage of the alternating current input voltage V1 is directly detected. In such a way, the smoothing capacitor 163 that has been necessary as the external component of the integrated circuit 190 in embodiment 1 can be deleted. Therefore, a power supply system that is inexpensive and capable of achieving the space saving can be provided.

Embodiment 4

Figure 8:
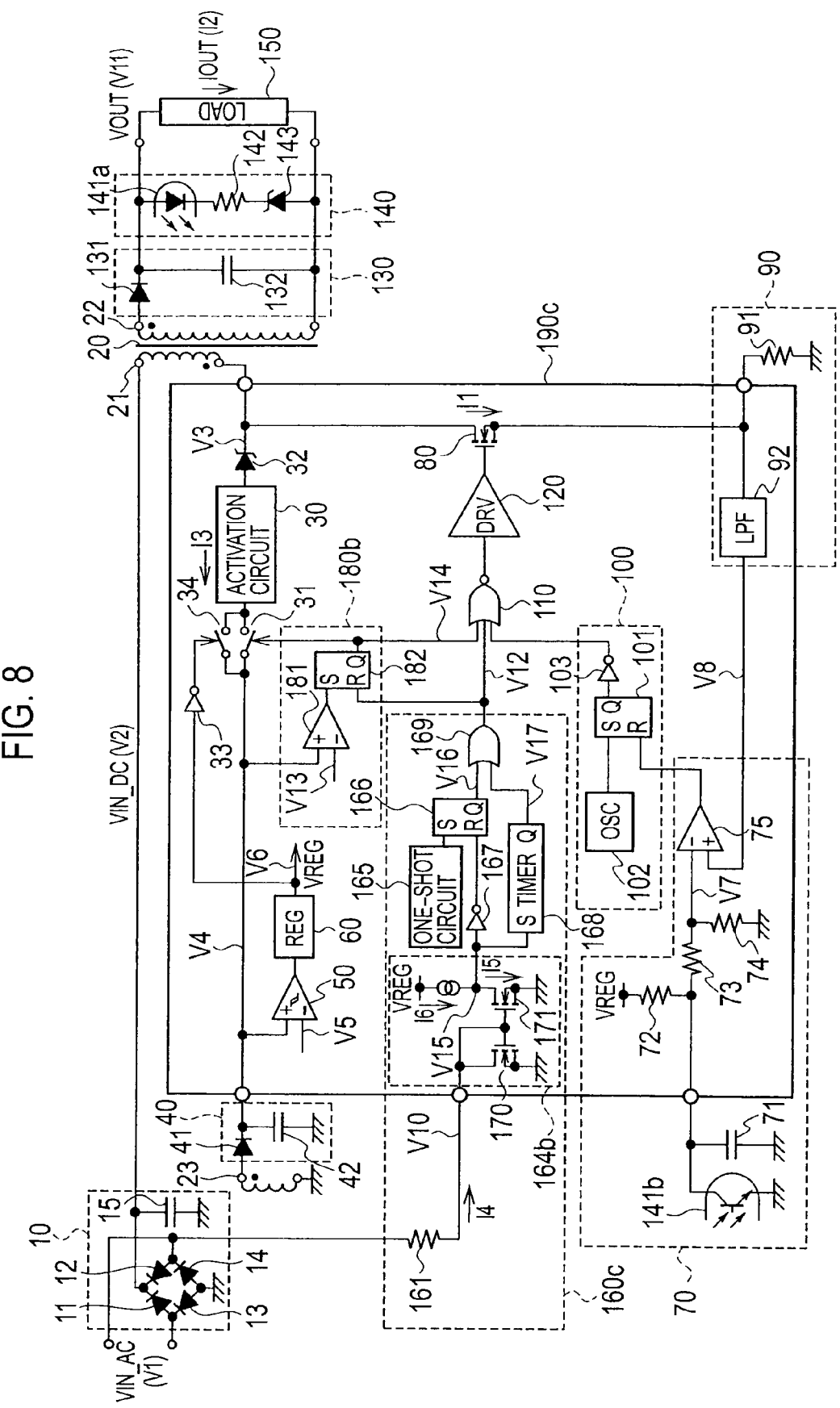
FIG. 8 is a circuit diagram of a switching power supply device of embodiment 4.

In comparison with the switching power supply device of embodiment 3 shown in FIG. 6, a switching power supply device of embodiment 4 shown in FIG. 8 has a configuration in which the input detection comparator 164 of the voltage input mode in embodiment 3 is changed to an input detection comparator 164*b* of a current input mode, and the resistor 162 in embodiment 3, which is the external component of the integrated circuit 190*b*, is deleted.

First, a description is made of configurations and operations of the input detection comparator 164*b*. The input detection comparator 164*b* is composed of a reference current source 16 and a current mirror circuit formed of a first N-type MOSFET 170 and a second N-type MOSFET 171.

In such a configuration, a current signal I4 obtained by performing current conversion for the alternating current input voltage V1 by the resistor 161 is inputted to an input terminal of the current mirror circuit. Then, an input current signal I5 that flows through the first N-type MOSFET 170 and the second N-type MOSFET 171 is generated based on the current signal I4.

When the alternating current input voltage V1 is high and the input current signal I5 is larger than the reference current I6, an input comparison voltage V15 turns to the L level. when the alternating current input voltage V1 is low and the input current signal I5 is smaller than the reference current I6, the input comparison voltage V15 turns to the H level.

Hence, even in the case of using the input detection comparator 164*b* shown in FIG. 8, similar effects to those of the input detection comparator 164 shown in FIG. 6 can be obtained.

Moreover, in comparison with the switching power supply device of embodiment 3, the input detection comparator 164 is changed from the voltage input mode to the current input mode in the switching power supply device of embodiment 4. In such a way, the resistor 162 that has been necessary as the external component of the integrated circuit 190*b* in the switching power supply device of embodiment 3 becomes unnecessary. Therefore, a power supply system that is more inexpensive and capable of achieving the space saving more can be provided.

Embodiment 5

Figure 9:
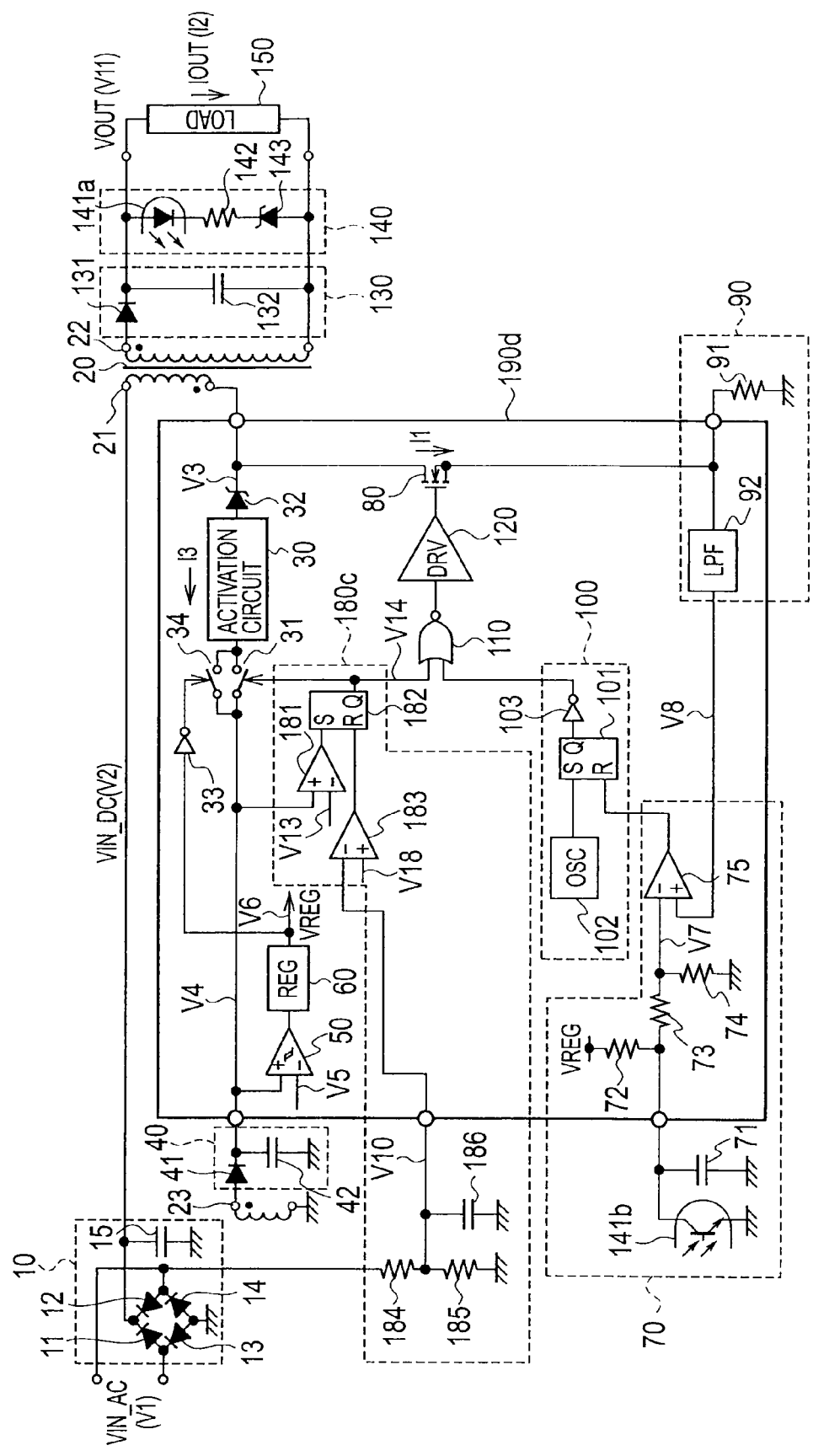
FIG. 9 is a circuit diagram of a switching power supply device of embodiment 5.

In a switching power supply device of embodiment 5 shown in FIG. 9, an overvoltage protection circuit 180*c* having a function of the overvoltage protection circuit 180*a* and a function of the low-input protection circuit 160*a* is provided to the switching power supply device of embodiment 1 shown in FIG. 3.

The overvoltage protection circuit 180*c* includes two voltage dividing resistors 184 and 185, a capacitor 186, the overvoltage detection comparator 181, the overvoltage latch 182, and the latch release comparator 183 that receives the input detection signal V10 of the capacitor 186 to the inversion input terminal thereof. The overvoltage protection circuit 180*c* does not include the input detection comparator 164 shown in FIG. 3.

With such a configuration, in the case of the overvoltage, the operation prohibition signal is outputted to the switching element 80 by using the overvoltage detection comparator 181 and the overvoltage latch 182. In such a way, the overvoltage protection is performed.

Moreover, the latch release comparator 183 monitors the alternating current input voltage V1, and releases the operation prohibited state when the alternating current input voltage V1 drops to the threshold value or less. In such a way, even in the high-power type power supply system in which the capacitance value of the input smoothing capacitor 15 is large, the operation prohibited state of the switching element 80 is released instantaneously after the alternating current input voltage V1 is turned OFF.

Note that the switching power supply device of the present invention is not limited to the above-described embodiments 1 to 5. For example, as a modification example of the switching power supply device of embodiment 2 shown in FIG. 5, the switching power supply device of the present invention may adopt a configuration, in which the input detection comparator 164 is deleted, the output of the capacitor 163 is connected only to the RESET terminal R of the overvoltage latch 182, and the two voltage dividing resistors 161 and 162, the capacitor 163, and the overvoltage protection circuit having the overvoltage detection comparator 181 and the overvoltage latch 182 are used. Even with such a configuration, similar effects to the effects of the switching power supply device of embodiment 2 are obtained.

Moreover, as a modification example of the switching power supply device of embodiment 3 shown in FIG. 6, for example, the switching power supply device of the present invention may use, as the overvoltage protection circuit, a configuration including the overvoltage protection circuit 180b and the low-input protection circuit 160b, in which the output of the OR gate 169 is connected only to the RESET terminal R of the overvoltage latch 182. With such a configuration, similar effects to the effects of the switching power supply device of Embodiment 3 are obtained.

Moreover, as a modification example of the switching power supply device of embodiment 4 shown in FIG. 8, for example, the switching power supply device of the present invention may use, as the overvoltage protection circuit, a configuration including the overvoltage protection circuit 180b and the low-input protection circuit 160c, in which the output of the OR gate 169 is connected only to the RESET terminal R of the overvoltage latch 182. With such a configuration, similar effects to the effects of the switching power supply device of embodiment 4 are obtained.

What is claimed is:

1. A switching power supply device, comprising:
an input rectifying/smoothing circuit that rectifies and smoothes an AC input voltage and outputs a DC input voltage;
a switching element connected to an output end of the input rectifying/smoothing circuit through a primary winding of a transformer;
an output rectifying/smoothing circuit that rectifies and smoothes a voltage induced in a secondary winding of the transformer and outputs a DC output voltage; and
a control circuit that controls ON and OFF of the switching element,
wherein the control circuit includes an overvoltage protection circuit that directly detects a voltage that is proportional to an amplitude of the AC input voltage and detects a voltage corresponding to the DC output voltage, outputs an overvoltage operation prohibition signal for prohibiting ON and OFF operations of the switching element when the voltage corresponding to the DC output voltage rises to a first threshold value or more, and releases the overvoltage operation prohibition signal when a low-input protection circuit directly detects that the voltage proportional to the amplitude of the AC input voltage falls below a second threshold value by discontinuing the AC input voltage by discontinuing the AC input voltage.

2. The switching power supply device according to claim 1, wherein the overvoltage protection circuit detects a voltage obtained by rectifying and smoothing the AC input voltage.

3. The switching power supply device according to claim 1, wherein the overvoltage protection circuit detects a pulsating voltage proportional to a peak value of the AC input voltage.

4. The switching power supply device according to claim 1, wherein the overvoltage protection circuit performs current conversion for a pulsating voltage proportional to a peak value of the AC input voltage, and detects the voltage subjected to the current conversion.

5. The switching power supply device according to claim 1, wherein,
an input terminal of the low-input protection circuit is connected, on an integrated circuit, commonly with an input terminal for detecting the voltage proportional to an amplitude of the AC input voltage in the overvoltage protection circuit.

6. A switching power supply device, comprising:
an input rectifying/smoothing circuit that rectifies and smoothes an AC input voltage and outputs a DC input voltage;
a switching element connected to an output end of the input rectifying/smoothing circuit through a primary winding of a transformer;
an output rectifying/smoothing circuit that rectifies and smoothes a voltage induced in a secondary winding of the transformer and outputs a DC output voltage; and
a control circuit that controls ON/OFF of the switching element, the control circuit including:
an overvoltage protection circuit that detects a voltage corresponding to the DC output voltage; and
a low-input protection circuit that is connected to the overvoltage protection circuit and detects a voltage directly corresponding to waveform of the AC input voltage, wherein,
the overvoltage protection circuit outputs an overvoltage operation prohibition signal for prohibiting ON and OFF operations of the switching element when the voltage corresponding to the DC output voltage rises to a first threshold value or more, and
the low-input protection circuit releases the overvoltage operation prohibition signal when a peak value of the voltage directly corresponding to a waveform of the AC input voltage falls below a second threshold value by discontinuing the AC input voltage.

7. The switching power supply device according to claim 6, wherein the low-input protection circuit rectifies and smoothes the AC input voltage, and detects the rectified and smoothed voltage.

8. The switching power supply device according to claim 6, wherein the low-input protection circuit detects a pulsating voltage proportional to a peak value of the AC input voltage.

9. The switching power supply device according to claim 6, wherein the low-input protection circuit performs current conversion for a pulsating voltage proportional to a peak value of the AC input voltage, and detects the voltage subjected to the current conversion.

* * * * *